US012619467B2

(12) United States Patent
Kwon et al.

(10) Patent No.: US 12,619,467 B2
(45) Date of Patent: May 5, 2026

(54) ELECTRONIC DEVICE MANAGING MEMORY AND OPERATION METHOD THEREFOR

(71) Applicant: Samsung Electronics Co., Ltd., Suwon-si (KR)

(72) Inventors: Jiman Kwon, Suwon-si (KR); Dongho Kim, Suwon-si (KR); Hakryoul Kim, Suwon-si (KR); Jaehyeon Park, Suwon-si (KR); Geonhee Back, Suwon-si (KR); Jiseop Song, Suwon-si (KR); Dongwook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/333,061

(22) Filed: Jun. 12, 2023

(65) Prior Publication Data
US 2023/0325245 A1 Oct. 12, 2023

Related U.S. Application Data

(63) Continuation of application No. PCT/KR2021/019415, filed on Dec. 20, 2021.

(30) Foreign Application Priority Data

Jan. 12, 2021 (KR) ........................ 10-2021-0004261

(51) Int. Cl.
*G06F 3/06* (2006.01)
*G06F 9/50* (2006.01)

(52) U.S. Cl.
CPC .......... *G06F 9/5027* (2013.01); *G06F 3/0608* (2013.01); *G06F 3/0631* (2013.01); *G06F 3/0673* (2013.01)

(58) Field of Classification Search
CPC .... G06F 9/5027; G06F 3/0608; G06F 3/0631; G06F 3/0673; G06F 9/5022; G06F 9/445;
(Continued)

(56) References Cited

U.S. PATENT DOCUMENTS

2014/0325518 A1 10/2014 Kim et al.
2018/0217777 A1 8/2018 Jiang et al.
(Continued)

FOREIGN PATENT DOCUMENTS

JP 2008-225669 A 9/2008
JP 2012-248200 A 12/2012
(Continued)

OTHER PUBLICATIONS

International Search Report dated Mar. 21, 2022, issued in International Patent Application No. PCT/KR2021/019415.
(Continued)

*Primary Examiner* — Francisco A Grullon
(74) *Attorney, Agent, or Firm* — Jefferson IP Law, LLP

(57) ABSTRACT
An electronic device is provided. The electronic device includes a memory and a processor. The processor may be configured to identify that an application using large-capacity memory satisfying a specified condition is running, identify a first memory capacity required to run the application, and terminate at least one process allocated to the memory until the first memory capacity is secured as the available capacity of the memory.

18 Claims, 11 Drawing Sheets

(58) Field of Classification Search
CPC ...... G06F 12/02; G06F 9/5016; G06F 3/0604;
G06F 3/0653; G06F 9/5044; G06F
12/023; G06F 2212/70
See application file for complete search history.

(56)                      References Cited

U.S. PATENT DOCUMENTS

| | | |
|---|---|---|
| 2018/0307600 A1 | 10/2018 | Wang et al. |
| 2019/0034222 A1 | 1/2019 | Choi |
| 2019/0220318 A1* | 7/2019 | Yang ...................... G06F 9/445 |
| 2019/0303206 A1 | 10/2019 | Shutoh |
| 2020/0081741 A1 | 3/2020 | Mitsugi |
| 2021/0004272 A1 | 1/2021 | Hwang et al. |

FOREIGN PATENT DOCUMENTS

| | | |
|---|---|---|
| JP | 2019-179525 A | 10/2019 |
| KR | 10-2005-0076529 A | 7/2005 |
| KR | 10-0900439 B1 | 6/2009 |
| KR | 10-2014-0127104 A | 11/2014 |
| KR | 10-1591601 B1 | 2/2016 |
| KR | 10-2017-0090278 A | 8/2017 |
| KR | 10-2018-0088573 A | 8/2018 |
| KR | 10-2019-0046995 A | 5/2019 |
| KR | 10-2019-0106623 A | 9/2019 |
| KR | 10-2020-0080164 A | 7/2020 |
| KR | 10-2022-0033912 A | 3/2022 |
| WO | 2018/211628 A1 | 11/2018 |

OTHER PUBLICATIONS

Korean Office Action dated Jul. 8, 2025, issued in a Korean Patent
Application No. 10-2021-0004261.
Korean Office Action with English translation dated Mar. 30, 2026;
Korean Patent Application No. 10-2021-0004261.

* cited by examiner

ELECTRONIC DEVICE MANAGING MEMORY AND OPERATION METHOD THEREFOR

CROSS-REFERENCE TO RELATED APPLICATION(S)

This application is a continuation application, claiming priority under § 365(c), of an International application No. PCT/KR2021/019415, filed on Dec. 20, 2021, which is based on and claims the benefit of a Korean patent application number 10-2021-0004261, filed on Jan. 12, 2021, in the Korean Intellectual Property Office, the disclosure of which is incorporated by reference herein in its entirety.

BACKGROUND

1. Field

The disclosures relate to an electronic device managing a memory and an operation method thereof.

2. Description of Related Art

An electronic device may be configured in two aspects of hardware and software. In the hardware aspect, the electronic device may include a central processing unit (CPU) or system on a chip (SOC) for calculating and processing a process and a memory where data for the process is loaded. In the software aspect, the electronic device may include an operating system (or kernel) for performing basic management of the system and applications that run on the operating system to execute the processes. For example, the CPU loads the data corresponding to the operating system and executes it, and loads an application on the memory while the operating system is running to execute the application on the operating system. The process is finally performed by the execution of the application.

Recently, as the electronic device provides various services, various applications may be included and, as several applications are simultaneously executed, the management of the memory where the applications are loaded and executed becomes important.

The above information is presented as background information only to assist with an understanding of the disclosure. No determination has been made, and no assertion is made, as to whether any of the above might be applicable as prior art with regard to the disclosure.

SUMMARY

Due to limited memory (random access memory (RAM)) capacity, electronic devices using the Android operating system need to cope with the much demand for the memory by monitoring the memory status and terminating minimum essential processes to maintain system performance at an acceptable level. Accordingly, the electronic device may perform a memory securing operation (Kswapd, Direct Reclaim), low memory killer (LMK), low memory killer daemon (LMKD), and the like to monitor the memory status and prevent system performance degradation due to heavy use of the memory. However, the memory securing operation may not quickly escape from the memory shortage situation if an application requiring much memory in a short time is executed.

Recently, as applications requiring memory in a short time increase, electronic devices using the Android operating system need to quickly preempt available memory capacity not to fall into memory shortage.

Aspects of the disclosure are to address at least the above-mentioned problems and/or disadvantages and to provide at least the advantages described below. Accordingly, an aspect of the disclosure is to provide an electronic device and an operation method thereof, which may quickly handle a reduction in available memory due to execution of an application requiring large-capacity memory by adding and changing the LMKD memory securing operation if the application is executed.

Additional aspects will be set forth in part in the description which follows and, in part, will be apparent from the description, or may be learned by practice of the presented embodiments.

In accordance with an aspect of the disclosure, an electronic device is provided. The electronic device includes a memory and a processor configured to identify execution of an application using a large-capacity memory meeting a designated condition, identify a first memory capacity necessary to execute the application, and terminate at least one process allocated to the memory until as much available capacity of the memory as the first memory capacity is obtained.

In accordance with another aspect of the disclosure, a method for operating an electronic device is provided. The method includes identifying execution of an application using a large-capacity memory meeting a designated condition, identifying a first memory capacity necessary to execute the application based on execution of the application, and terminating at least one process allocated to the memory until as much available capacity of the memory as the first memory capacity is obtained.

In accordance with another aspect of the disclosure, a non-transitory storage medium may comprise a program including executable instructions that, when executed by a processor, allow the processor to identify execution of an application using a large-capacity memory meeting a designated condition, identify a first memory capacity necessary to execute the application based on execution of the application, and terminate at least one process allocated to the memory until as much available capacity of the memory as the first memory capacity is obtained.

According to an embodiment, the electronic device may manage the memory to be able to quickly handle a reduction in available memory due to execution of an application using large-capacity memory when the application is executed.

According to an embodiment, the electronic device may manage the memory to prevent performance degradation due to memory shortage and quickly handle a reduction in available memory.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "user" may denote a human or another device using the electronic device.

Figure 1:
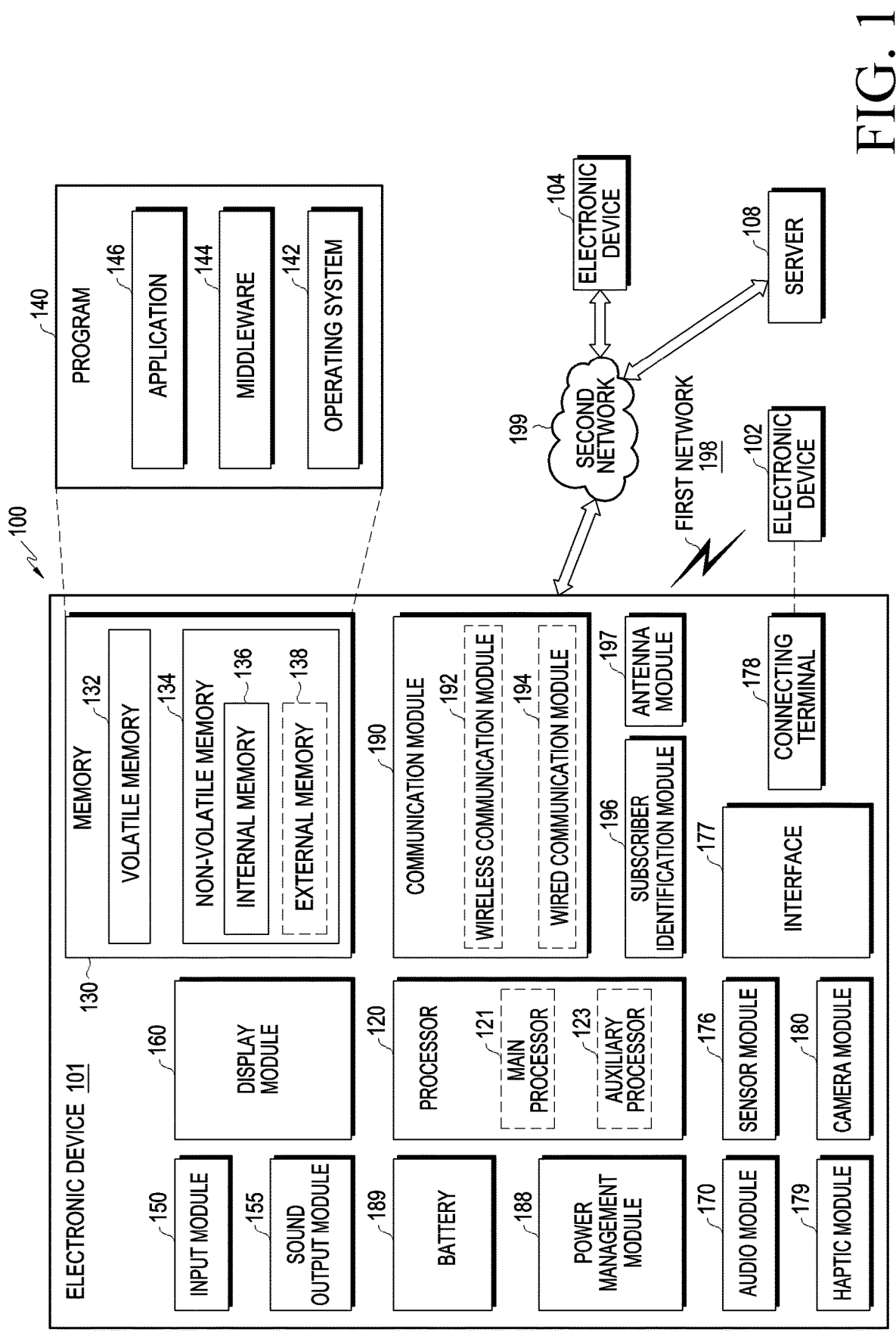
FIG. 1 is a view illustrating a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

In the following embodiment, an operation for decreasing the used capacity of the memory and increasing the available capacity in a state in which the available capacity of the memory is insufficient may be referred to as a memory obtaining operation or memory recovery operation.

Figure 2:
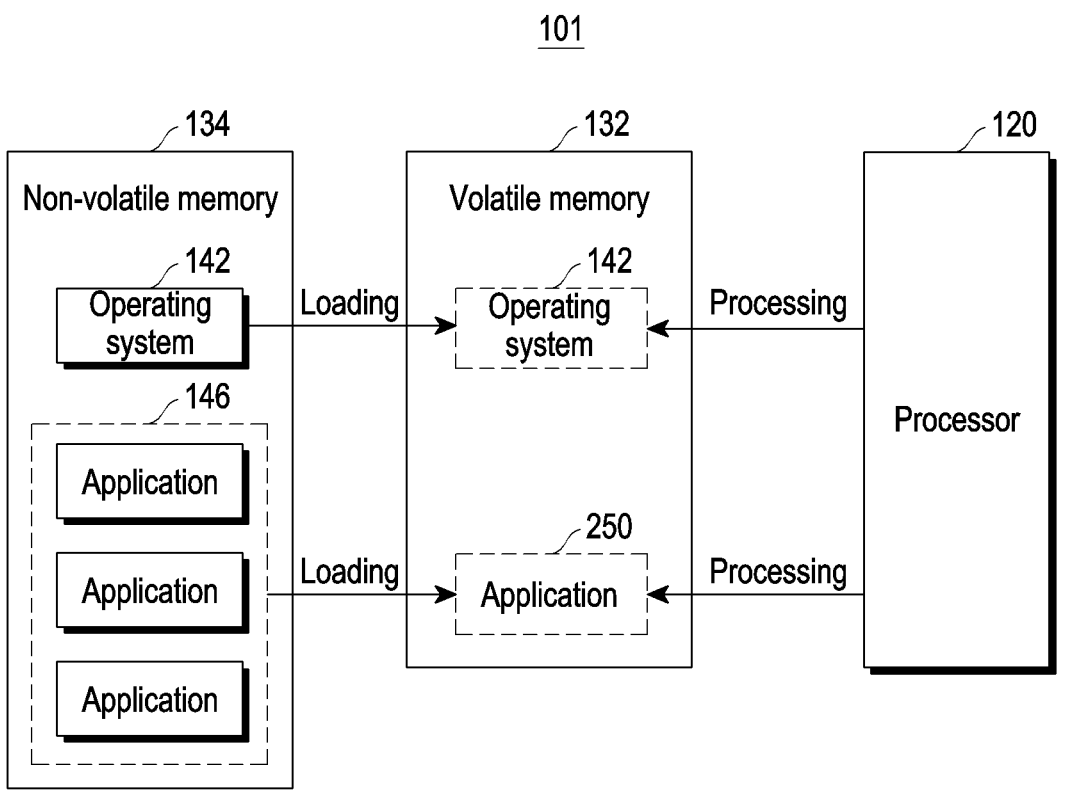
FIG. 2 is a block diagram schematically illustrating a configuration of an electronic device according to an embodiment of the disclosure.

FIG. 2 is a block diagram schematically illustrating a configuration of an electronic device according to an embodiment of the disclosure.

Referring to FIGS. 1 and 2, according to various embodiments, an electronic device 101 may include a processor 120, a volatile memory 132, and a non-volatile memory 134. For example, the non-volatile memory 134 may include a flash memory. The volatile memory 132 may include a random access memory (RAM).

According to an embodiment, the processor 120 may control the operation of the operating system (or kernel) 142 and a plurality of applications 146 stored in the non-volatile memory 134.

According to an embodiment, the processor 120 may drive the operating system (or kernel) 142 installed on the non-volatile memory 134 and control the operating system (or kernel) 142 to execute the process of the application executed by the operating system (or kernel) 142.

According to an embodiment, the processor 120 may control the volatile memory 132 to allocate the process according to execution of at least one application 250 among the plurality of applications 146 to the volatile memory 132. For example, the processor 120 may process to load the application 250 from the non-volatile memory 134 to the volatile memory 132 and execute the process of the application 250 loaded on the volatile memory 132. The application 250 loaded on the volatile memory 132 may occupy the available capacity of the volatile memory 132 and execute it on the operating system (or kernel) 142. The available capacity of the volatile memory 132 may mean the capacity of the storage area where no data is loaded in the entire storage area of the volatile memory 132 or which is not allocated for the currently running process. The operating system (or kernel) 142 may perform a command to load the application 250 of the non-volatile memory 134 to the volatile memory 132 and execute it under the control of the processor 120. The operating system (or kernel) 142 may perform a command to allocate the process of the application 250 to the volatile memory 132 or deallocate it.

According to an embodiment, the processor 120 may identify execution (or execution command) of the application using a large-capacity memory meeting a designated condition. For example, the processor 120 may identify the application whose execution (or execution command) is identified through a callback function. The processor 120 may identify whether the application whose application is identified among the plurality of applications 146 stored in the non-volatile memory 134 is an application using a large-capacity memory meeting the designated condition. For example, the application using a large-capacity memory meeting the designated condition may include an application using a camera, an application having a history of having previously occupied a designated memory capacity (e.g., RAM capacity of 1 GB) or more, and an application predesignated by the user or the processor 120.

According to an embodiment, upon identifying execution of the application using a large-capacity memory, the processor 120 may identify the memory capacity requiring execution of the application.

According to an embodiment, the processor 120 may terminate at least one process allocated (or occupied) to the volatile memory 132 until as much available capacity of the volatile memory 132 as the identified memory capacity is obtained. For example, although the available capacity of the volatile memory 132 is not insufficient, the processor 120 may terminate at least one process allocated (or occupied) to the volatile memory 132 until as much available capacity of the volatile memory 132 as the identified memory capacity is obtained.

According to an embodiment, upon identifying execution of the application using the large-capacity memory meeting the designated condition, the processor 120 may start the operation of terminating at least one process allocated (or occupied) to the volatile memory 132 before requesting the volatile memory 132 to allocate memory for the process of the application.

According to an embodiment, the processor 120 may obtain and store a first memory value including memory values related to the Android kernel and the process size value of the application upon executing the application, based on execution of the application using the large-capacity memory meeting the designated condition. Further, the processor 120 may obtain and store a second memory value including memory values related to the Android value upon terminating the application and the process size value of the application based on termination of the application.

According to an embodiment, the processor 120 may identify the memory capacity necessary to execute the application using the large-capacity memory using the first memory value and the second memory value.

According to an embodiment, in the volatile memory 132, as the operation time of at least one application 250 elapses, the execution of the process may be repeated, or several processes may be executed, so that the available capacity may become insufficient. To determine whether the available capacity of the volatile memory 132 is insufficient, the processor 120 may continuously or periodically identify the available capacity of the volatile memory 132 and identify (or monitor) whether the available capacity of the volatile memory 132 is insufficient based on the identified available capacity.

According to an embodiment, upon identifying that the available capacity of the volatile memory 132 is insufficient, the processor 120 may perform a memory obtaining operation or memory recovery operation to secure an available capacity of the volatile memory 132. The operating system (or kernel) 142 may perform a command to execute the memory obtaining operation and/or memory recovery operations (e.g., at least one of a first memory recovery operation, a second memory recovery operation, or a third memory recovery operation) under the control of the processor 120.

According to an embodiment, the processor 120 may identify whether the memory capacity to allocate a process (e.g., the process of the application to be executed) to the volatile memory 132 is insufficient with respect to the available capacity of the volatile memory 132. For example, upon identifying that the available capacity of the volatile memory 132 is insufficient to allocate a process, the processor 120 may be configured to execute the first memory recovery operation to increase the available capacity of the volatile memory 132. For example, the first memory recovery operation may include a first operation (e.g., kernel swap daemon (kswapd)) and a second operation (e.g., direct reclaim) to secure an available capacity by compressing some of at least one process allocated to a partial area of the volatile memory 132 or a partial area of the virtual memory in the volatile memory 132 or changing the cached capacity (cachedmem) into an available capacity.

According to an embodiment, the processor 120 may identify the available capacity of the volatile memory 132 based on a memory shortage event caused by the first memory recovery operation and execute at least one of the second memory recovery operation or third memory recovery operation to terminate at least one process allocated to the volatile memory 132. For example, the processor 120 may perform the second memory recovery operation upon identifying execution of an application that does not use the large-capacity memory. In contrast, the processor 120 may perform the third memory recovery operation upon identifying execution of the application using the large-capacity memory meeting the designated condition. For example, the third memory recovery operation may recover the available capacity of the volatile memory 132 at a speed higher than that of the second memory recovery operation. For example, the second memory recovery operation may be a module or daemon (or service) (e.g., low memory killer daemon (LMKD)) of the operating system (or kernel) 142 to secure the available capacity of the volatile memory 132. The third memory recovery operation may be a function in which some operation conditions in the LMKD have been eased.

According to an embodiment, the processor 120 may determine whether the available capacity for allocating a process to the volatile memory 132 is insufficient and designate thresholds for the available capacity of the volatile memory 132 to determine execution or stop of each of the first memory recovery operation, second memory recovery operation, and third memory recovery operation to secure an available capacity. For example, among the designated thresholds, a first threshold (e.g., low watermark*1.1) may be designated as a value for comparison with the available capacity of the volatile memory 132 to execute and stop the second memory recovery operation and the third memory recovery operation. Further, among the designated thresholds, a second threshold (e.g., low watermark) and a third threshold (e.g., min watermark) and a fourth threshold (e.g., high watermark) may be designated as values for comparison with the available capacity of the volatile memory 132 to execute and stop the first memory recovery operation. The first threshold (e.g., low watermark*1.1) may be a value larger than the fourth threshold. Further, the first threshold may be designated as a value larger than the second threshold, by multiplying the second threshold by a designated value. The third threshold may be designated as a value larger than the second threshold and smaller than the fourth threshold. The third threshold may be designated as a value smaller than the second threshold. The fourth threshold may be designated as a value smaller than the first threshold and larger than the third threshold.

Meanwhile, the designated thresholds may not be limited thereto. For example, each of the thresholds may be varied depending on the performance of the processor 120 and the volatile memory 132 while the order of the thresholds (e.g., the order of first threshold>fourth threshold>second threshold>third threshold) is not changed.

According to an embodiment, when the available capacity of the volatile memory 132 reaches a designated threshold (low watermark, hereinafter referred to as a second threshold), the processor 120 may identify that the available capacity of the volatile memory 132 to allocate at least one process is insufficient and process to execute the first memory recovery operation. According to an embodiment, when the identified available capacity reaches the designated second threshold (low watermark), the processor 120 may execute the first operation of the first memory recovery operation. The processor 120 may perform the first operation to obtain the available capacity of the volatile memory 132. The processor 120 may stop the first operation when the available capacity identified at the request for allocating at least one process exceeds the fourth threshold. According to an embodiment, the processor 120 may execute the second operation when the available capacity identified during the first operation is the designated third threshold (min watermark) or less. The processor 120 may perform the second operation to obtain the available capacity of the volatile memory 132. The processor 120 may stop the second operation of the first memory recovery operation when the available capacity identified during the first operation exceeds the third threshold.

According to an embodiment, the processor 120 may execute the second memory recovery operation (or third memory recovery operation) to terminate the process selected based on process termination conditions. For example, when the available capacity of the volatile memory 132 is the first threshold (e.g., low watermark*1.1) or less, the processor 120 may identify a memory shortage event and select processes to be terminated, which meet the process termination conditions. For example, the second memory recovery operation (or third memory recovery operation) may be an operation by the module or daemon (or service) (e.g., LMK or LMKD) of the operating system (or kernel) 142. For example, the process termination conditions may include a condition (e.g., first condition) for identifying the total usage (swapused total) of the swap memory and a condition (e.g., second condition) for identifying the importance limit value (OOM_SCORE_ADJ limit value) of the allocated process. For example, the processor 120 may identify whether a designated delay time (e.g., 100 ms or 10 ms) elapses from the previously performed second memory recovery operation (or third memory recovery operation) and, if the designated delay time elapses, execute the second memory recovery operation (or third memory recovery operation) to select a to-be-terminated process (e.g., select one process), and terminate the selected to-be-terminated process. For example, the delay time (e.g., 100 ms or 10 ms) may be designated so that the processes allocated to the memory are overly terminated. For example, the delay time designated for the third memory recovery operation may be shorter than the delay time designated for the second memory recovery operation. For example, the delay time of the second memory recovery operation may be designated as 100 ms, and the delay time of the third memory recovery operation may be designated as 10 ms.

According to an embodiment, when executing the second memory recovery operation, the processor 120 may identify the level of the memory shortage state according to the memory shortage event caused by the first memory recovery operation. For example, if the identified memory shortage state level indicates a first level (medium pressure), the processor 120 may select the latest process used among at least one process designated with an importance value larger than the importance (OOM_SCORE_ADJ) limit value (e.g., 850) as the to-be-terminated process and terminate the selected process. If the importance value of at least one selected to-be-terminated process is lower than the designated importance limit value (e.g., 850), the processor 120 may not terminate the at least one selected to-be-terminated process. For example, if the identified memory shortage state level indicates a second level (critical pressure), the processor 120 may select at least one to-be-terminated process based on the process size and/or memory occupancy without identifying the condition of the importance (OOM_SCORE_ADJ) limit value (e.g., 850). For example, the processor 120 may select at least one process with the largest importance value (e.g., the process with the lowest priority or highest importance) among the processes allocated to the volatile memory 132 and select the process, which occupies the most capacity of the volatile memory 132 among the at least one selected process, as the to-be-terminated process. The importance (OOM_SCORE_ADJ) indicates the importance of the process and may be set to a value, e.g., from −1000 to 1000. For example, the processor 120 may determine the importance value of the process depending on the degree of exposure to the user. The processor 120 may obtain the value for the importance along with process information and prioritize the process with the higher importance value in selecting the to-be-terminated process.

According to an embodiment, if the identified available capacity value is the first threshold or less, and execution (or execution command) of the application using the large-capacity memory is identified, the processor 120 may execute the third memory recovery operation. The processor 120 may select at least one process with the largest importance among the processes allocated to the volatile memory 132 without identifying the process termination conditions (e.g., first condition and/or second condition). In other words, the processor 120 may select the process occupying the most capacity of the volatile memory 132 among the at least one selected process, as the to-be-terminated process. The processor 120 may execute the third memory recovery operation to terminate the selected process. For example, the processor 120 may identify whether a designated delay time (e.g., 10 ms) elapses after the previously executed third memory recovery operation is terminated, execute the third memory recovery operation after the designated delay time to select the to-be-terminated process (e.g., selects one process) and terminate the selected to-be-terminated process. For example, the processor 120 may not perform the third memory recovery operation until a memory shortage event due to the third memory recovery operation is identified after the selected to-be-terminated process is terminated. However, the technical spirit of the disclosure is not limited thereto, and the delay time of the third memory recovery operation may be set to a value smaller than the delay time (e.g., 100 ms) of the second memory recovery operation. Further, if the delay time of the second memory recovery operation reduces, the delay time of the third memory recovery operation may also be designated to reduce in proportion thereto.

As such, in an embodiment of the disclosure, main components of the electronic device have been described through the electronic device of FIG. 2. According to an embodiment of the disclosure, however, the components shown in FIG. 2 are not essential components, and the electronic device may be implemented with more or less components than those shown. The position of the major components described above in connection with FIG. 2 may be varied according to an embodiment of the disclosure.

Meanwhile, at least some of the operations performed by the electronic device 101, described below, may be performed by the processor 120.

Figure 3:
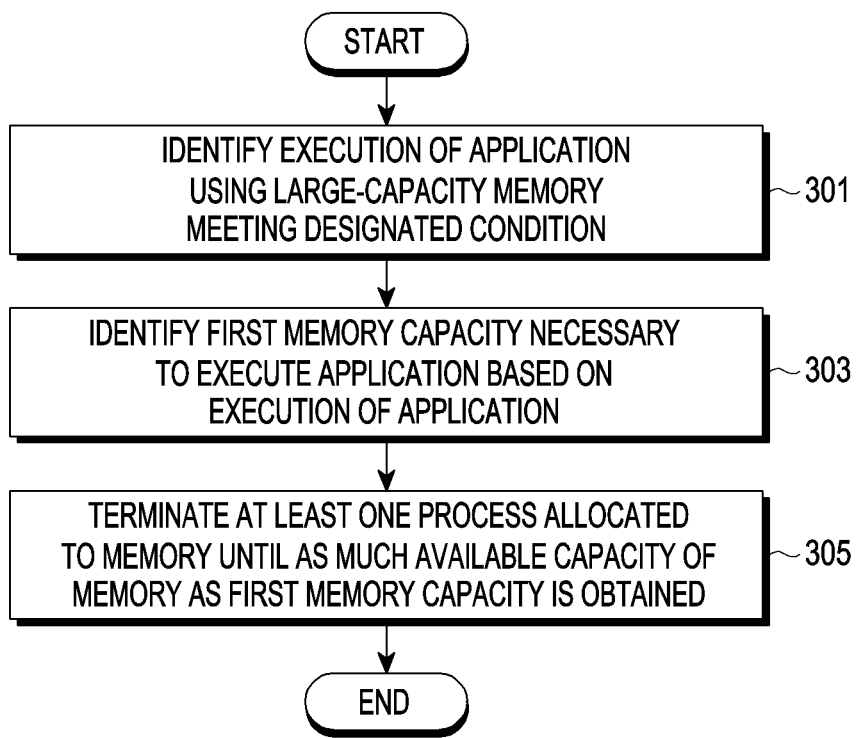
FIG. 3 is a flowchart illustrating an operation method of an electronic device according to an embodiment of the disclosure.

FIG. 3 is a flowchart illustrating an operation method of an electronic device according to an embodiment of the disclosure.

Referring to FIG. 3, according to an embodiment, in operation 301, the electronic device 101 may identify execution of an application using a large-capacity memory meeting a designated condition.

According to an embodiment, in operation 303, the electronic device 101 may identify a first memory capacity necessary to execute an application based on execution of the application using the large-capacity memory meeting the designated condition.

According to an embodiment, in operation 305, the electronic device 101 may terminate at least one process allocated to the volatile memory 132 until as much available capacity of the volatile memory 132 as the first memory capacity is obtained. For example, the electronic device 101 may sequentially or simultaneously terminate at least one process.

Figure 4:
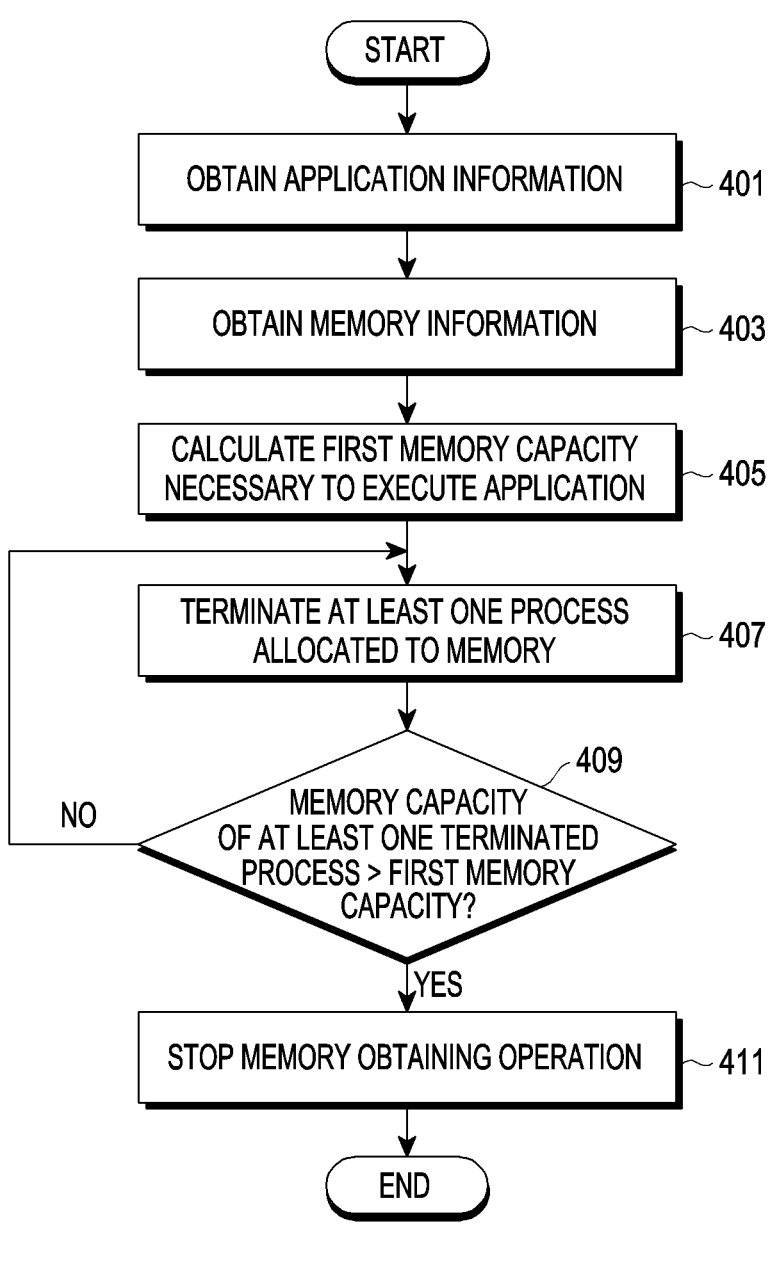
FIG. 4 is a flowchart illustrating a method for performing a memory obtaining operation by an electronic device according to an embodiment of the disclosure.

FIG. 4 is a flowchart illustrating a method for performing a memory obtaining operation by an electronic device according to an embodiment of the disclosure.

Referring to FIG. 4, according to an embodiment, in operation 401, the electronic device 101 may obtain information about an application whose execution command is identified among a plurality of applications stored in the non-volatile memory 134. Further, the electronic device 101 may identify whether the application is an application using a large-capacity memory meeting a designated condition based on the information about the application.

According to an embodiment, in operation 403, upon identifying that the application is the application using the large-capacity memory, the electronic device 101 may obtain information about the memory.

According to an embodiment, in operation 405, the electronic device 101 may calculate a first memory capacity necessary to execute the application using the large-capacity memory.

According to an embodiment, in operation 407, the electronic device 101 may terminate at least one process allocated to the volatile memory 132.

According to an embodiment, in operation 409, the electronic device 101 may compare the memory capacity of the at least one terminated process with the first memory capacity. Further, the electronic device 101 may identify whether the memory capacity of the at least one terminated process is larger than the first memory capacity. For example, upon identifying that at least one process having as much memory capacity as the first memory capacity is not yet terminated (no in operation 409), the electronic device 101 may terminate the processes allocated to the volatile memory 132 repeatedly until the memory capacity of the at least one terminated process is equal to or larger than the first memory capacity. Or, the electronic device 101 may simultaneously terminate at least one process having as much memory capacity as the first memory capacity. For example, the electronic device 101 may select the to-be-terminated process meeting the process termination conditions. For example, the process termination conditions may include a condition (e.g., second condition) for identifying the importance limit value (OOM_SCORE_ADJ limit value) of the allocated process.

According to an embodiment, in operation 411, if at least one process having as much memory capacity as the first memory capacity is terminated (yes in operation 409), the electronic device 101 may stop the memory obtaining operation.

Figure 5:
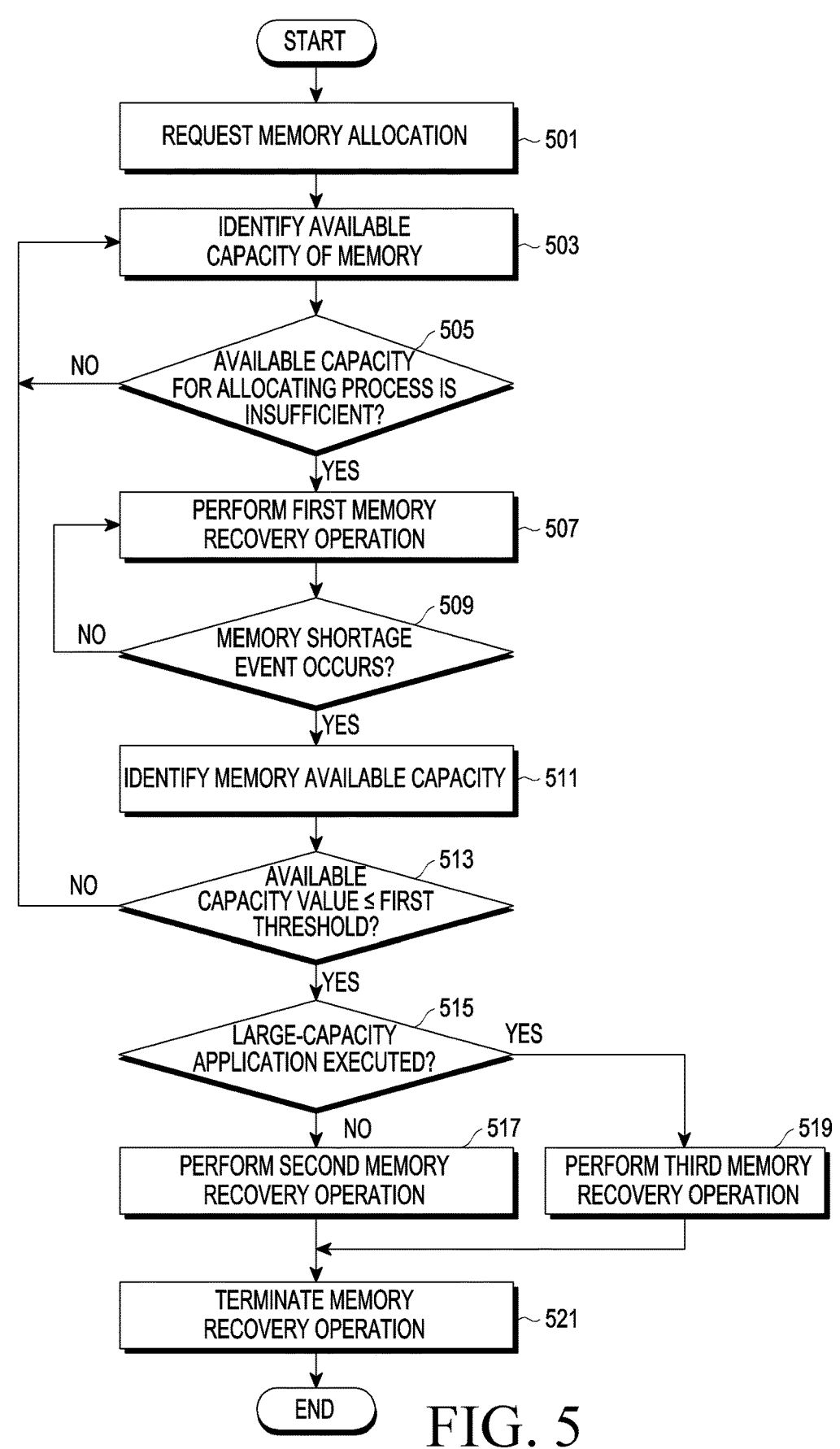
FIG. 5 is a flowchart illustrating a method for performing a plurality of memory recovery operations by an electronic device according to an embodiment of the disclosure.

FIG. 5 is a flowchart illustrating a method for performing a plurality of memory recovery operations by an electronic device according to an embodiment of the disclosure. According to an embodiment, a method for performing a plurality of memory recovery operations by the electronic device 101 may be performed by a processor (e.g., the processor 120) controlling the operating system (or kernel) (e.g., the operating system 142 of FIG. 1) which is a software component installed on the electronic device (e.g., the electronic device 101 of FIGS. 1 and 2).

Referring to FIG. 5, according to an embodiment, in operation 501, the electronic device 101 may identify a memory allocation request in response to an application execution command. In operation 503, the electronic device 101 may identify the current available capacity of the volatile memory 132 to allocate a process of the application to the volatile memory 132 in response to the memory allocation request. For example, the electronic device 101 may identify the current available capacity of the volatile memory 132 by identifying the total memory usage being used (or occupied) by the existing processes allocated to the volatile memory 132.

According to an embodiment, in operation 505, the electronic device 101 may identify whether the identified current available capacity is sufficient or insufficient to allocate the process of the application. According to an embodiment, upon identifying that the available capacity for allocating the process of the application is not insufficient (no in operation 505), the electronic device 101 may allocate the process of the application to the volatile memory 132.

According to an embodiment, upon identifying that the available capacity for allocating the process of the application is sufficient (yes in operation 505), the electronic device 101 may perform a first memory recovery operation to increase the available capacity of the volatile memory 132 in operation 507. For example, the first memory recovery operation may be an operation executed by at least one module of the operating system (or kernel) (e.g., the operating system 142 of FIGS. 1 and 2) to secure an available capacity of memory configured as an embedded system. The electronic device 101 may continuously secure the available capacity of memory by executing the first memory recovery operation until a sufficient available capacity to allocate the process is secured. For example, the electronic device 101 may perform the first memory recovery operation to compress partial data of at least one process allocated to the volatile memory 132 and store part of the compressed process in a partial area and, as necessary, load and use it. For example, the first memory recovery operation may include a first operation (e.g., kswapd) and a second operation (e.g., direct reclaim) to secure an available capacity by compressing some of at least one process allocated to the memory or changing the cached capacity (cachedmem) into an available capacity. The first memory recovery operation may have a large operation load and have a high priority in the computation processing operation by the processor 120 (e.g., the main computation device (CPU) included in the processor 120).

According to an embodiment, in operation 509, the electronic device 101 may identify whether a memory shortage event (memory pressure event) occurs due to the first memory recovery operation.

According to an embodiment, when a memory shortage event occurs (yes in operation 509), the electronic device 101 may identify the current available capacity of the volatile memory 132 in operation 511. In operation 513, the electronic device 101 may identify whether the identified available capacity value is a designated first threshold or less. When the identified available capacity value is not equal to or less than the first threshold (no in operation 513), the electronic device 101 may identify the available capacity of the volatile memory 132 without performing the second memory recovery operation and third memory recovery operation.

According to an embodiment, when the identified available capacity value is the designated first threshold or less (yes in operation 513), the electronic device 101 may identify whether the application whose execution command is identified is an application using the large-capacity memory meeting the designated condition in operation 515. If the application whose execution command is identified is not the application using the large-capacity memory, the electronic device 101 may perform the second memory recovery operation in operation 517. In contrast, if the application whose execution command is identified is the application using the large-capacity memory, the electronic device 101 may perform the third memory recovery operation in operation 519. For example, the electronic device 101 may perform the second memory recovery operation or third memory recovery operation, terminating at least one other process allocated to the volatile memory 132 and securing an available capacity of the volatile memory 132. For example, the electronic device 101 may terminate at least one process allocated to the volatile memory 132 based on information related to the process priority. According to an embodiment, the electronic device 101 may perform the second memory recovery operation based on process termination conditions. For example, the process termination conditions may include a condition (e.g., first condition) for identifying the total usage (swapused total) of the memory and a condition (e.g., second condition) for identifying the importance limit value (ADJ limit value) of the allocated process. According to an embodiment, the electronic device 101 may perform the third memory recovery operation without considering the process termination conditions (e.g., the first condition and the second condition).

According to an embodiment, in operation 521, the electronic device 101 may terminate the second memory recovery operation or third memory recovery operation after terminating the to-be-terminated process. The electronic device 101 may not perform the second memory recovery operation or third memory recovery operation until before a memory shortage event due to the next first memory recovery operation is identified after terminating the to-be-terminated process selected through the second memory recovery operation or third memory recovery operation. For example, the electronic device 101 may perform operation 503 after terminating the second memory recovery operation or third memory recovery operation. In other words, the electronic device 101 may identify the available capacity of the volatile memory 132 again after terminating the second memory recovery operation or third memory recovery operation.

Figure 6:
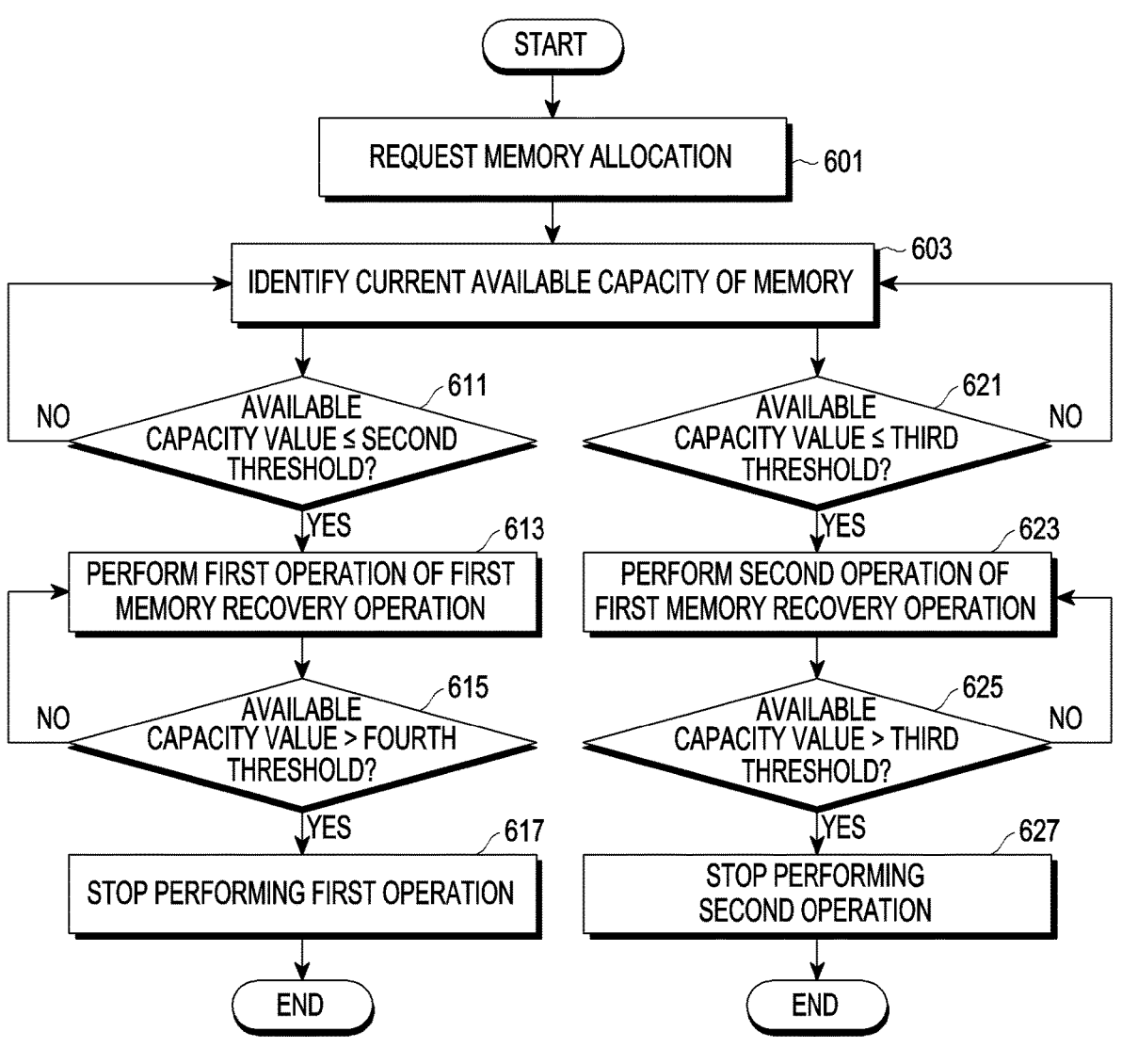
FIG. 6 is a flowchart illustrating a method for performing a first memory recovery operation by an electronic device according to an embodiment of the disclosure.

FIG. 6 is a flowchart illustrating a method for performing a first memory recovery operation by an electronic device according to an embodiment of the disclosure.

Referring to FIG. 6, according to an embodiment, in operation 601, the electronic device 101 may identify a memory allocation request in response to an application execution command. For example, upon identifying an execution command of the application using the large-capacity memory meeting the designated condition, the electronic device 101 may identify a memory allocation request to execute processes of the application and execute a memory allocation-related function of the operating system (or kernel) (e.g., the operating system 142 of FIGS. 1 and 2).

According to an embodiment, in operation 603, the electronic device 101 may identify the current available capacity of the volatile memory 132 in response to the memory allocation request. For example, the electronic device may attempt memory allocation of processes of the application through the memory allocation-related function and identify the current available capacity of the volatile memory 132.

According to an embodiment, the electronic device 101 may perform operation 611 and/or operation 621 depending on whether the identified available capacity is sufficient to allocate the processes of the application.

According to an embodiment, after identifying the available capacity of the volatile memory (after operation 603), the electronic device 101 may identify whether the identified available capacity value is a designated second threshold (e.g., low watermark) or less in operation 611. When the identified available capacity value is the designated second threshold or less (yes in operation 611), the electronic device 101 may perform the first operation of the first memory recovery operation and increase the available capacity of the volatile memory 132 in operation 613. Further, the electronic device 101 may cause a memory shortage event of the first memory recovery operation. For example, when the efficiency of increasing the available capacity of the volatile memory 132 by performing the first operation of the first memory recovery operation is not good (e.g., when the time consumed for memory recovery is longer than a preset time or an increment in available capacity relative to the memory page size inspected for memory recovery is smaller than a preset value), the electronic device 101 may cause a memory shortage event. When the identified available capacity value is not equal to or less than the designated second threshold (no in operation 611), the electronic device 101 may continuously or periodically identify the available capacity of the volatile memory 132.

According to an embodiment, in operation 615, the electronic device 101 may identify whether the increased available capacity value exceeds the fourth threshold indicating a designated memory recovery threshold (e.g., high watermark). If the increased available capacity value exceeds the designated fourth threshold (yes in operation 615), the electronic device 101 may identify that the available capacity of the volatile memory 132 is sufficient to stop performing the first operation in operation 617. In contrast, unless the increased available capacity value exceeds the designated fourth threshold (no in operation 615), the electronic device 101 may repeat operation 613 until the increased available capacity value exceeds the designated fourth threshold.

According to an embodiment, after identifying the available capacity of the volatile memory (after operation 603), the electronic device 101 may identify whether the identified available capacity value is a designated third threshold (e.g., min watermark) or less in operation 621. When the identified available capacity value is the designated third threshold or less (yes in operation 621), the electronic device 101 may perform the second operation of the first memory recovery operation and increase the available capacity of the volatile memory 132 in operation 623. Further, the electronic device 101 may cause a memory shortage event of the first memory recovery operation. For example, when the efficiency of increasing the available capacity of the volatile memory 132 by performing the second operation of the first memory recovery operation is not good (e.g., when the time consumed for memory recovery is longer than a preset time or an increment in available capacity relative to the memory page size inspected for memory recovery is smaller than a preset value), the electronic device 101 may cause a memory shortage event. When the identified available capacity value is not equal to or less than the designated third threshold (no in operation 621), the electronic device 101 may continuously or periodically identify the available capacity of the volatile memory 132.

According to an embodiment, in operation 625, the electronic device 101 may identify whether the increased available capacity value exceeds the designated third threshold. If the increased available capacity value exceeds the designated third threshold (yes in operation 625), the electronic device 101 may identify that the available capacity of the volatile memory 132 is sufficient to stop performing the second operation in operation 627. In contrast, unless the increased available capacity value exceeds the designated third threshold (no in operation 625), the electronic device 101 may repeat operation 623 until the increased available capacity value exceeds the designated third threshold.

Figure 7:
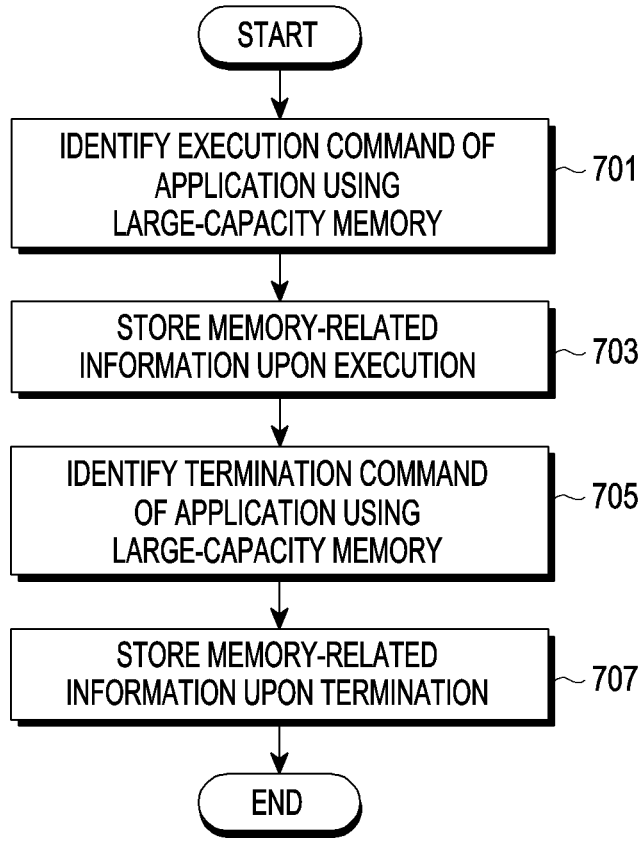
FIG. 7 is a flowchart illustrating a method for storing memory information when an electronic device terminates an application according to an embodiment of the disclosure.

FIG. 7 is a flowchart illustrating a method for storing memory information when an electronic device terminates an application according to an embodiment of the disclosure.

Referring to FIG. 7, according to an embodiment, in operation 701, the electronic device 101 may identify an execution command of an application using a large-capacity memory meeting a designated condition. For example, the electronic device 101 may identify the execution command of the application through a callback function.

According to an embodiment, in operation 703, upon identifying the execution command, the electronic device 101 may store memory-related information (e.g., memory-related information of the Android system) of the application upon execution (or at the time of execution). For example, the electronic device 101 may store the memory-related information of the application in the non-volatile memory 134. For example, the memory-related information may include Android kernel-related memory values (e.g., total ION memory value, total graphic memory value, total Kernel Vmalloc page size, and current available memory value (Memfree value+CacheMem value)). For example, the ION memory value may mean the shared memory value used in the Android kernel, the graphic memory value may mean the graphic-related memory value used in the Android kernel, and Kernel Vmalloc page size may mean the buffer size of the non-continuous memory used in the Android kernel.

According to an embodiment, in operation 705, the electronic device 101 may identify a termination command of an application using a large-capacity memory meeting a designated condition. For example, the electronic device 101 may identify the termination command of the application through a callback function.

According to an embodiment, in operation 707, upon identifying the termination command, the electronic device 101 may store the memory-related information of the application upon termination (or at the time of termination). For example, the electronic device 101 may store the memory-related information of the application in the non-volatile memory 134. For example, the memory-related information may include Android kernel-related memory values (e.g., process size of the executed application using the large-capacity memory, total ION memory value, total graphic memory value, total Kernel Vmalloc page size, Kernel Kreclaimable page size, and current available memory value (Memfree value+CacheMem value)). For example, the ION memory value may mean the shared memory value used in the Android kernel, the graphic memory value may mean the graphic-related memory value used in the Android kernel, Kernel Vmalloc page size may mean the buffer size of the non-continuous memory used in the Android kernel, and Kernel Kreclaimable page size may mean the size of the recoverable page among the allocated pages used in the Android kernel.

According to an embodiment, if the application using the large-capacity memory is again executed later, the electronic device 101 may identify (or calculate) the memory capacity necessary to execute the application using the stored memory-related information.

Figure 8:
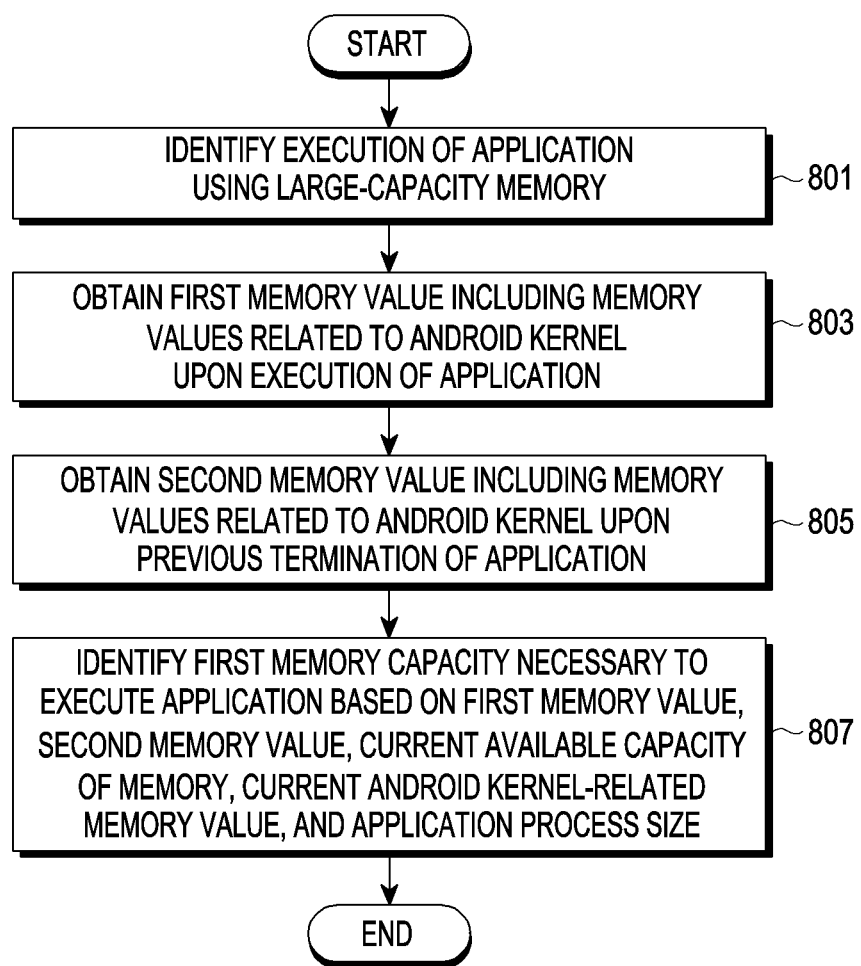
FIG. 8 is a flowchart illustrating a method for identifying memory capacity for executing an application by a user equipment (UE) according to an embodiment of the disclosure.

FIG. 8 is a flowchart illustrating a method for identifying memory capacity for executing an application by a UE according to an embodiment of the disclosure.

Referring to FIG. 8, according to an embodiment, in operation 801, the electronic device 101 may identify execution of an application using a large-capacity memory meeting a designated condition.

According to an embodiment, in operation 803, when a corresponding application is executed, the electronic device 101 may obtain a first memory value including memory values related to the Android kernel, stored when the application was executed previously. Further, the electronic device 101 may obtain system information at the time of execution of the application. For example, the first memory values may mean the sum of the total ION memory value, total graphic memory value, and total Kernel Vmalloc page size. Further, the electronic device 101 may obtain a third memory value (Memfree value+CacheMem value) available at the time of execution.

According to an embodiment, in operation 805, the electronic device 101 may obtain a second memory value including memory values related to the Android kernel, stored when the application was previously terminated. For example, the second memory values may include mean the sum of the second memory value (e.g., the application process size (e.g., the process size cached in the memory) stored in the non-volatile memory 134 at the time of previous termination of the application, total ION memory value, total graphic memory value, Kreclaimable page size, and total Kernel Vmalloc page size. Further, the electronic device 101 may obtain a fourth memory value (Memfree value+CacheMem value) available at the previous termination time, at the time of termination.

According to an embodiment, in operation 807, the electronic device 101 may identify the first memory capacity necessary to execute the application based on the first memory value, second memory value, current memory available capacity (e.g., the available capacity of the volatile memory 132 at the time of execution of the application), and the process size of the application. For example, the electronic device 101 may obtain a first value indicating a difference between the second memory value and the first memory value. Further, the electronic device 101 may obtain a second value indicating a difference between the third memory value and the fourth memory value. The electronic device 101 may determine that the larger of the first value and the second value, minus the current available capacity of the volatile memory 132 (e.g., the available capacity (Memfree value) of the volatile memory 132 at the time of execution of the application), the current application process size (e.g., the process size cached in the volatile memory 132), and current Kreclaimable page size, is the first memory capacity.

According to an embodiment, when the application is first executed, the second memory value may not be stored. If the second memory value is not stored, the electronic device 101 may determine the first memory capacity by multiplying the total size of the volatile memory 132 by a designated multiple. For example, if the total size of the volatile memory 132 is 1 GB, the electronic device 101 may determine that 256 MB, which is obtained by multiplying 1 GB by a designated multiple, e.g., 0.25, is the first memory capacity.

According to an embodiment, the electronic device 101 may determine the first memory capacity before memory allocation of the application is requested. This is why the memory usage of the application needs to be predicted before memory allocation.

Figure 9:
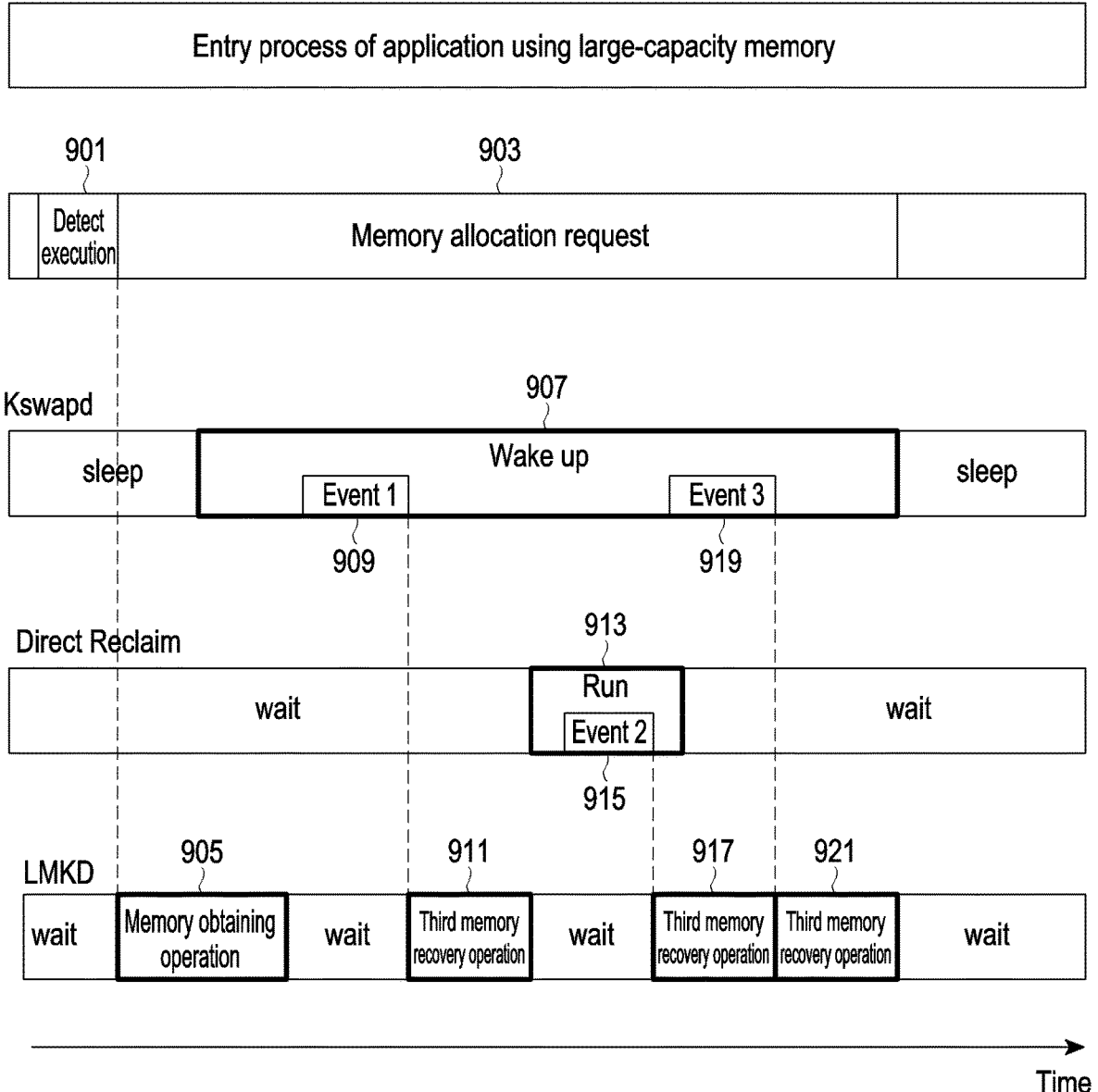
FIG. 9 is a view illustrating a method for performing a memory obtaining operation and a memory recovery operation by an electronic device according to an embodiment of the disclosure.

FIG. 9 is a view illustrating a method for performing a memory obtaining operation and a memory recovery operation by an electronic device according to an embodiment of the disclosure.

Referring to FIG. 9, according to an embodiment, in operation 901, the electronic device 101 may detect execution of an application using a large-capacity memory. In operation 903, upon detecting execution of the application, the electronic device 101 may request memory allocation for the process of the application.

According to an embodiment, in operation 905, the electronic device 101 may start a memory obtaining operation before requesting memory allocation for the process of the application. In this case, the electronic device 101 may identify the first memory capacity necessary to execute the application. The electronic device 101 may terminate at least one process occupying the volatile memory 132 based on the first memory capacity, obtaining the available capacity of the volatile memory 132. For example, the memory recovery operation may be a module or daemon (or service) (e.g., low memory killer daemon (LMKD)) of the operating system (or kernel) 142 (e.g., Android OS) to secure the available capacity of the volatile memory 132. For example, the memory recovery operation may be the operation of the electronic device described in connection with FIG. 4.

According to an embodiment, in operation 907, upon identifying that the available capacity of the volatile memory 132 is insufficient, the electronic device 101 may perform (wake up) a first operation (kswapd) of the first memory recovery operation. The electronic device 101 may perform the first operation of the first memory recovery operation, increasing the available capacity of the volatile memory 132.

According to an embodiment, in operation 909, a first memory shortage event may occur due to the first operation of the first memory recovery operation. In operation 911, the electronic device 101 may perform the third memory recovery operation at a first time based on the first memory shortage event. If the selected process (e.g., one process) is terminated by the third memory recovery operation, the electronic device 101 may stop performing the third memory recovery operation until the next memory shortage event is identified. In this case, the electronic device 101 may allow the LMKD to enter the wait state (wait).

According to an embodiment, in operation 913, upon identifying that the available capacity of the volatile memory 132 is insufficient, the electronic device 101 may perform (run) a second operation (direct reclaim) of the first memory recovery operation. The electronic device 101 may perform the second operation of the first memory recovery operation, increasing the available capacity of the volatile memory 132. When the available capacity of the volatile memory 132 is sufficiently secured, the electronic device 101 may stop performing the second operation of the first memory recovery operation. In this case, the electronic device 101 may allow the second operation of the first memory recovery operation to enter the wait state (wait).

According to an embodiment, in operation 915, a second memory shortage event may occur due to the second operation of the first memory recovery operation. In operation 917, the electronic device 101 may perform the third memory recovery operation at a second time based on the second memory shortage event. For example, the second time may be after the first time.

According to an embodiment, in operation 919, a third memory shortage event may occur due to the first operation of the first memory recovery operation. In operation 921, the electronic device 101 may perform the third memory recovery operation at a third time based on the third memory shortage event. For example, the third time may be after the second time. If the selected process (e.g., one process) is terminated by the third memory recovery operation, the electronic device 101 may stop performing the third memory recovery operation until the next memory shortage event is identified. In this case, the electronic device 101 may allow the LMKD to enter the wait state (wait).

The electronic device 101 may effectively address available capacity shortage of the volatile memory 132 in the entry process of the application using the large-capacity memory.

Figure 10:
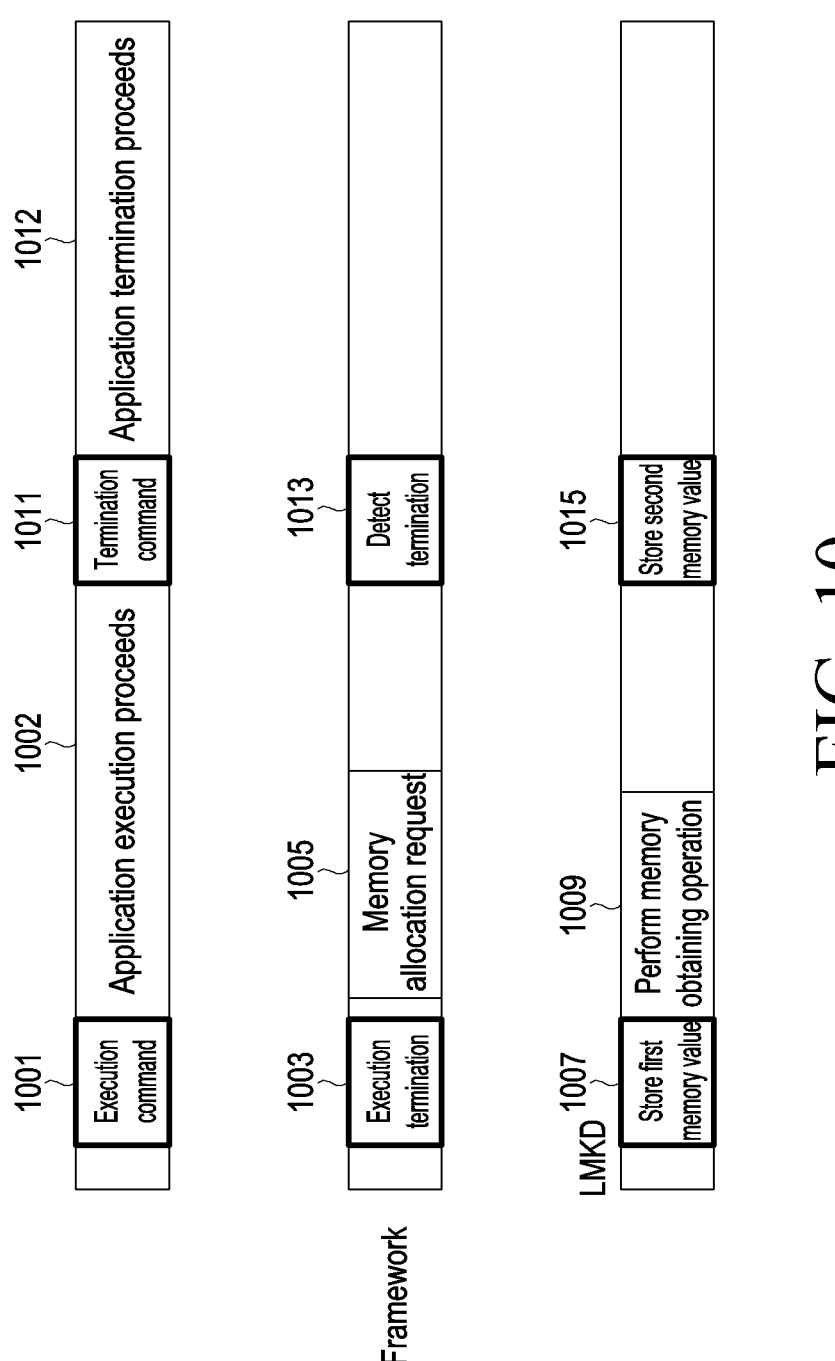
FIG. 10 is a view illustrating a method for performing a memory obtaining operation by an electronic device according to an embodiment of the disclosure.

FIG. 10 is a view illustrating a method for performing a memory obtaining operation by an electronic device according to an embodiment of the disclosure.

Referring to FIG. 10, according to an embodiment, in operation 1001, the electronic device 101 may identify an execution command of an application. In operation 1002, the electronic device 101 may perform execution of the application in response to the execution command.

According to an embodiment, in operation 1003, the electronic device 101 may detect execution of the application in the framework of the operating system 142 (e.g., Android OS) and identify whether the application is the application using the large-capacity memory. In operation 1005, upon detecting execution of the application, the electronic device 101 may request memory allocation for the process of the application.

According to an embodiment, in operation 1007, upon identifying that the application is the application using the large-capacity memory, the electronic device 101 may obtain and store the first memory value at the start time. In operation 1009, before requesting memory allocation for the process of the application, the electronic device 101 may identify the first memory capacity using the first memory value and the second memory value and start a memory obtaining operation. The electronic device 101 may terminate at least one process occupying the volatile memory 132 based on the first memory capacity, obtaining the available capacity of the volatile memory 132. For example, the memory recovery operation may be a module or daemon (or service) (e.g., low memory killer daemon (LMKD)) of the operating system (or kernel) 142 (e.g., Android OS) to secure the available capacity of the volatile memory 132.

According to an embodiment, in operation 1011, the electronic device 101 may identify a termination command of the application. In operation 1012, the electronic device 101 may perform termination of the application in response to the termination command.

According to an embodiment, in operation 1013, the electronic device 101 may detect termination of the application in the framework of the operating system (e.g., Android OS). For example, the electronic device 101 may terminate at least part of the process of the application.

According to an embodiment, in operation 1015, if the execution of the application is terminated, the electronic device 101 may obtain and store the second memory value at the time of termination. For example, the second memory value may be used to perform a memory obtaining operation when the application is re-executed.

Figure 11:
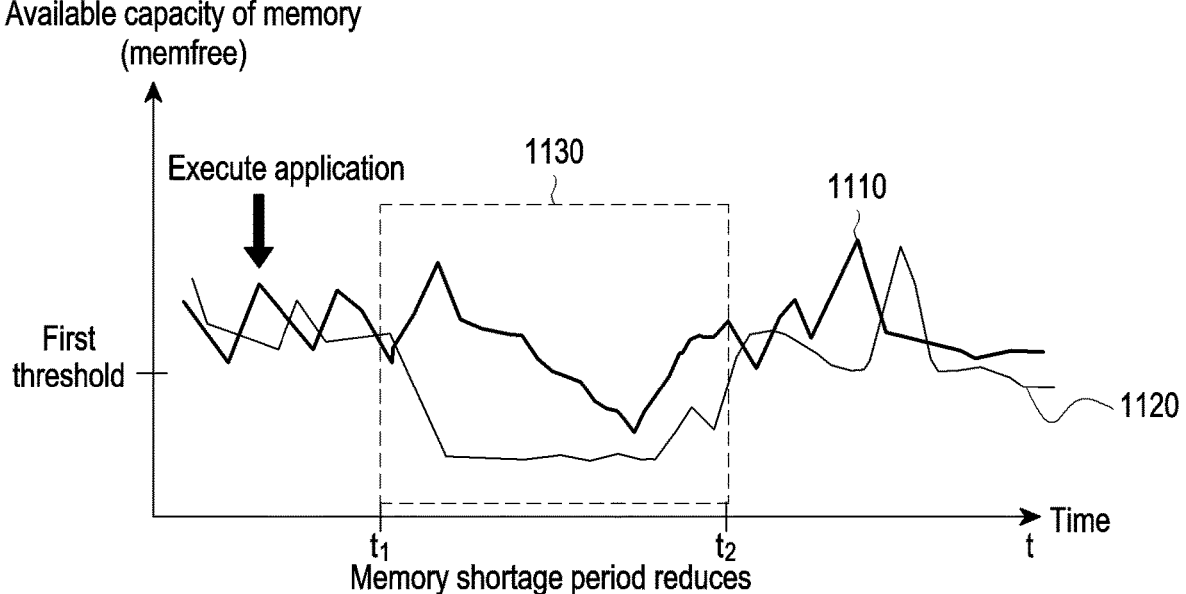
FIG. 11 is a graph illustrating available capacity of a memory according to an operation of an electronic device according to an embodiment of the disclosure.

FIG. 11 is a graph illustrating available capacity of a memory according to an operation of an electronic device according to an embodiment of the disclosure.

Referring to FIG. 11, according to an embodiment, the first graph 1110 may represent the available capacity of the volatile memory 132 by the execution of an application using a large-capacity memory (e.g., an application using a camera) when the electronic device 101 performs the memory obtaining operation and memory recovery operations of the disclosure. The second graph 1120 may represent the available capacity of the volatile memory 132 by the execution of the application using the large-capacity memory when the electronic device 101 does not perform the memory obtaining operation and memory recovery operations of the disclosure.

According to an embodiment, in the first graph 1110 as compared with the second graph 1120, the memory shortage period (e.g., period when the available capacity is smaller than the first threshold) may be reduced in the application execution period 1130. Accordingly, the electronic device 101 may effectively address available capacity shortage of the volatile memory 132 in the execution period 1130 of the application using the large-capacity memory.

According to various embodiments, an electronic device 101 may comprise a memory 130 and a processor 120 configured to identify execution of an application using a large-capacity memory meeting a designated condition, identify a first memory capacity necessary to execute the application, and terminate at least one process allocated to the memory until as much available capacity of the memory as the first memory capacity is obtained.

The processor may be configured to, upon identifying execution of the application, start terminating the at least one process before requesting memory allocation for a process of the application to the memory.

The processor may be configured to, upon identifying that an available capacity for allocating a process of the application to the memory is insufficient, execute a first memory recovery operation for recovering partial data of at least one process allocated to the memory to increase the available capacity of the memory, identify the available capacity of the memory based on a first memory shortage event occurring due to the first memory recovery operation, if a value of the identified available capacity is a designated threshold or less, identify a level of the first memory shortage event, and wait for a designated delay time after terminating a process selected based on the level of the first memory shortage event among the at least one process allocated to the memory and terminate a next process selected based on a level of a second memory shortage event occurring due to the first memory recovery operation.

The designated delay time may be shorter than a delay time designated when an application other than the application using the large-capacity memory is executed.

The processor may be configured to terminate the selected process based on the level of the memory shortage event without identifying a swap usage (swapused) value.

The processor may be configured to obtain a first memory value including memory values related to an Android kernel stored when the application is previously executed, based on execution of the application and store a second memory value including memory values related to the Android kernel upon termination of the application and a process size value of the application based on termination of the application.

The processor may be configured to identify the first memory capacity based on the first memory value, the second memory value, a current available capacity of the memory, a current Android kernel-related memory value, and the process size of the application.

The processor may be configured to determine the first memory capacity by multiplying a total size of the memory by a designated multiple if the second memory value is not stored.

The processor may be configured to, if execution of any one application among a plurality of applications stored in the electronic device is requested, identify whether the any one application is the application using the large-capacity memory meeting the designated condition.

The application using the large-capacity memory may include an application using a camera included in the electronic device, an application occupying more capacity of the memory than a designated capacity, and a designated application.

According to an embodiment, a method for operating an electronic device may comprise identifying execution of an application using a large-capacity memory meeting a designated condition, identifying a first memory capacity necessary to execute the application based on execution of the application, and terminating at least one process allocated to the memory until as much available capacity of the memory as the first memory capacity is obtained.

Terminating the at least process may include, upon identifying execution of the application, starting terminating the at least one process before requesting memory allocation for a process of the application to the memory.

The method for operating the electronic device may further comprise, upon identifying that an available capacity for allocating a process of the application to the memory is insufficient, executing a first memory recovery operation for recovering partial data of at least one process allocated to the memory to increase the available capacity of the memory, identifying the available capacity of the memory based on at least one memory shortage event occurring due to the first memory recovery operation, if a value of the identified available capacity is a designated threshold or less, identifying a level of the at least one memory shortage event, and waiting for a designated delay time after terminating a process selected based on the level of the first memory shortage event among the at least one process allocated to the memory and terminating a next process selected based on a level of a second memory shortage event occurring due to the first memory recovery operation.

The designated delay time may be shorter than a delay time designated when an application other than the application using the large-capacity memory is executed.

Terminating the selected process may include terminating the selected process based on the level of the memory shortage event without identifying a swap usage (swapused) value.

The method for operating the electronic device may further comprise obtaining a first memory value including memory values related to an Android kernel stored when the application is previously executed, based on execution of the application and storing a second memory value including memory values related to the Android kernel upon termination of the application and a process size value of the application based on termination of the application.

Identifying the first memory capacity may include identifying the first memory capacity based on the first memory value, the second memory value, a current available capacity of the memory, a current Android kernel-related memory value, and the process size of the application.

The method for operating the electronic device may further comprise determining the first memory capacity by multiplying a total size of the memory by a designated multiple if the second memory value is not stored.

The method for operating the electronic device may further comprise, if execution of any one application among a plurality of applications stored in the electronic device is requested, identifying whether the any one application is the application using the large-capacity memory meeting the designated condition.

According to an embodiment, a non-transitory storage medium may comprise a program including executable instructions that, when executed by a processor, allow the processor to identify execution of an application using a large-capacity memory meeting a designated condition, identify a first memory capacity necessary to execute the application based on execution of the application, and terminate at least one process allocated to the memory until as much available capacity of the memory as the first memory capacity is obtained.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
memory, storing instructions, including volatile memory; and
at least one processor communicatively coupled to the memory,
wherein the instructions, when executed by the at least one processor individually or collectively, cause the electronic device to:
identify execution of an application that has a volatile memory capacity usage for execution that meets a designated condition,
identify a first volatile memory capacity to use to execute the application,
terminate at least one process allocated to the volatile memory until as much available capacity of the volatile memory as the first volatile memory capacity is obtained, and
allocate a process of the application to the volatile memory, based on the available capacity of the volatile memory obtained by the terminating of the at least one process, and
wherein the terminating of the at least one process allocated to the volatile memory is started at a time, which is in a period that begins upon the identifying of the execution of the application and ends before the allocation of the process of the application to the volatile memory is requested.

2. The electronic device of claim 1, wherein the instructions, when executed by the at least one processor individually or collectively, further cause the electronic device to:
upon identifying that the available capacity of the volatile memory for allocating the process of the application to the volatile memory is insufficient, execute a first memory recovery operation for recovering partial data of at least one process allocated to the volatile memory to increase the available capacity of the volatile memory,
identify the available capacity of the volatile memory based on a first memory shortage event occurring due to the first memory recovery operation,
in response to a value of the identified available capacity being a designated threshold or less, identify a level of the first memory shortage event, and
wait for a designated delay time after terminating a process selected based on the level of the first memory shortage event among the at least one process allocated to the volatile memory, and terminate a next process selected based on a level of a second memory shortage event occurring due to the first memory recovery operation.

3. The electronic device of claim 2, wherein the designated delay time is shorter than a delay time designated when an application, other than the application that has the volatile memory capacity usage for execution that meets the designated condition, is executed.

4. The electronic device of claim 3, wherein the instructions, when executed by the at least one processor is individually or collectively, further cause the electronic device to:
terminate the selected process based on the level of the first memory shortage event without identifying a swap usage (swapused) value.

5. The electronic device of claim 1, wherein the instructions, when executed by the at least one processor individually or collectively, further cause the electronic device to:
obtain a first memory value including memory values related to an Android kernel stored when the application is previously executed, based on the execution of the application, and
store a second memory value including memory values related to the Android kernel upon termination of the application and a process size value of the application based on termination of the application.

6. The electronic device of claim 5, wherein the instructions, when executed by the at least one processor individually or collectively, further cause the electronic device to:
identify the first volatile memory capacity based on the first memory value, the second memory value, a current available capacity of the volatile memory, a current Android kernel-related memory value, and the process size value of the application.

7. The electronic device of claim 6, wherein the instructions, when executed by the at least one processor individually or collectively, further cause the electronic device to:
determine the first volatile memory capacity by multiplying a total size of the volatile memory by a designated multiple in response to the second memory value not being stored.

8. The electronic device of claim 1, wherein the instructions, when executed by the at least one processor individually or collectively, further cause the electronic device to:
in response to execution of any one application, among a plurality of applications stored in the memory, being requested, identify whether the any one application is the application that has the volatile memory capacity usage for execution that meets the designated condition.

9. The electronic device of claim 8, wherein the application that has the volatile memory capacity usage for execution that meets the designated condition includes at least one of:

an application using a camera included in the electronic
device,
an application that uses a greater capacity of the volatile
memory during execution than a designated capacity,
or
a designated application.
10. A method performed by an electronic device including
volatile memory, the method comprising:
identifying execution of an application that has a volatile
memory capacity usage for execution that meets a
designated condition;
identifying a first volatile memory capacity to use to
execute the application based on execution of the
application;
terminating at least one process allocated to the volatile
memory until as much available capacity of the volatile
memory as the first volatile memory capacity is
obtained; and
allocating a process of the application to the volatile
memory, based on the available capacity of the volatile
memory obtained by the terminating of the at least one
process,
wherein the terminating of the at least one process allo-
cated to the volatile memory is started at a time, which
is in a period that begins upon the identifying of the
execution of the application and ends before the allo-
cation of the process of the application to the volatile
memory is requested.
11. The method of claim 10, further comprising:
upon identifying that the available capacity of the volatile
memory for allocating the process of the application to
the volatile memory is insufficient, executing a first
memory recovery operation for recovering partial data
of at least one process allocated to the volatile memory
to increase the available capacity of the volatile
memory;
identifying the available capacity of the volatile memory
based on a first memory shortage event occurring due
to the first memory recovery operation;
in response to a value of the identified available capacity
being a designated threshold or less, identifying a level
of the first memory shortage event; and
waiting for a designated delay time after terminating a
process selected based on the level of the first memory
shortage event among the at least one process allocated
to the volatile memory, and terminating a next process
selected based on a level of a second memory shortage
event occurring due to the first memory recovery
operation.
12. The method of claim 11, wherein the designated delay
time is shorter than a delay time designated when an
application, other than the application that has the volatile
memory capacity usage for execution that meets the desig-
nated condition, is executed.
13. The method of claim 12, wherein the terminating of
the selected process includes:

terminating the selected process based on the level of the
first memory shortage event without identifying a swap
usage (swapused) value.
14. The method of claim 10, further comprising:
obtaining a first memory value including memory values
related to an Android kernel stored when the applica-
tion is previously executed, based on the execution of
the application; and
storing a second memory value including memory values
related to the Android kernel upon termination of the
application and a process size value of the application
based on termination of the application.
15. The method of claim 14, wherein the identifying of the
first volatile memory capacity includes:
identifying the first volatile memory capacity based on the
first memory value, the second memory value, a current
available capacity of the volatile memory, a current
Android kernel-related memory value, and the process
size value of the application.
16. The method of claim 15, further comprising:
determining the first volatile memory capacity by multi-
plying a total size of the volatile memory by a desig-
nated multiple in response to the second memory value
not being stored.
17. The method of claim 10, further comprising:
in response to execution of any one application, among a
plurality of applications, being requested, identifying
whether the any one application is the application that
has the volatile memory capacity usage for execution
that meets the designated condition.
18. One or more non-transitory computer-readable stor-
age media storing instructions that, when executed individu-
ally or collectively by at least one processor of an electronic
device, cause the electronic device to perform operations,
the operations comprising:
identifying execution of an application that has a volatile
memory capacity usage for execution that meets a
designated condition;
identifying a first volatile memory capacity to use to
execute the application based on execution of the
application;
terminating at least one process allocated to a volatile
memory of the electronic device until as much avail-
able capacity of the volatile memory as the first volatile
memory capacity is obtained; and
allocating a process of the application to the volatile
memory, based on the available capacity of the volatile
memory obtained by the terminating of the at least one
process,
wherein the terminating of the at least one process allo-
cated to the volatile memory is started at a time, which
is in a period that begins upon the identifying of the
execution of the application and ends before the allo-
cation of the process of the application to the volatile
memory is requested.

* * * * *